(12) United States Patent
Stratton et al.

(10) Patent No.: US 11,446,682 B2
(45) Date of Patent: Sep. 20, 2022

(54) METHOD OF MANUFACTURING A ROTARY ATOMISER BELL CUP

(71) Applicant: Novanta Technologies UK Limited, Poole (GB)

(72) Inventors: John Stratton, Poole (GB); Christopher Beesley, Poole (GB)

(73) Assignee: Novanta Technologies UK Limited, Poole (GB)

( * ) Notice: Subject to any disclaimer, the term of this patent is extended or adjusted under 35 U.S.C. 154(b) by 195 days.

(21) Appl. No.: 16/617,621

(22) PCT Filed: May 24, 2018

(86) PCT No.: PCT/GB2018/051420
§ 371 (c)(1),
(2) Date: Nov. 27, 2019

(87) PCT Pub. No.: WO2018/220348
PCT Pub. Date: Dec. 6, 2018

(65) Prior Publication Data
US 2020/0101474 A1    Apr. 2, 2020

(30) Foreign Application Priority Data

Jun. 1, 2017   (GB) .................................... 1708763

(51) Int. Cl.
*B05B 3/10*    (2006.01)
*B22F 10/28*   (2021.01)
(Continued)

(52) U.S. Cl.
CPC .......... *B05B 3/1014* (2013.01); *B05B 5/0407* (2013.01); *B22F 10/28* (2021.01);
(Continued)

(58) Field of Classification Search
CPC ....... B33Y 10/00; B33Y 80/00; B05B 3/1014; B05B 5/0407; B05B 5/00; B05B 5/0403;
(Continued)

(56) References Cited

U.S. PATENT DOCUMENTS 4,423,840 A * 1/1984 Coeling ................ B05B 5/0407
239/3
5,286,573 A * 2/1994 Prinz ...................... B33Y 10/00
264/308
(Continued)

FOREIGN PATENT DOCUMENTS

CN      105709954 A      6/2016
DE    202007015115 U1    5/2008
(Continued)

OTHER PUBLICATIONS

International Search Report for PCT Application No. PCT/GB2018/051420 dated Jul. 26, 2018.
(Continued)

*Primary Examiner* — Sarang Afzali
(74) *Attorney, Agent, or Firm* — McCormick, Paulding & Huber PLLC

(57) ABSTRACT

A rotary atomiser bell cup comprising a bell portion for spraying media in use and a hub portion via which the bell portion is rotatingly drivable in use, wherein the hub portion is a machined metal portion and the bell portion has been built up on the hub using an additive manufacturing process.

6 Claims, 4 Drawing Sheets

(51) Int. Cl.
  *B05B 5/04* (2006.01)
  *B33Y 10/00* (2015.01)
  *B33Y 80/00* (2015.01)
(52) U.S. Cl.
  CPC ............... *B33Y 10/00* (2014.12); *B33Y 80/00* (2014.12); *Y10T 29/49433* (2015.01)
(58) Field of Classification Search
  CPC ......... Y10T 29/49432; Y10T 29/49433; Y10T 29/49799
  See application file for complete search history.

(56) References Cited

U.S. PATENT DOCUMENTS

| | | | | |
|---|---|---|---|---|
| 10,471,445 | B2 * | 11/2019 | Fritz | B05B 15/18 |
| 11,154,956 | B2 * | 10/2021 | Garay | F01D 5/005 |
| 2002/0043576 | A1 | 4/2002 | Dion | |
| 2003/0164406 | A1 | 9/2003 | Ballu | |
| 2009/0212122 | A1 | 8/2009 | Nolte et al. | |
| 2010/0193602 | A1 | 8/2010 | Ballu et al. | |
| 2011/0221100 | A1 | 9/2011 | Wesselky et al. | |
| 2014/0102162 | A1 * | 4/2014 | Morgenstern | B23Q 3/00 72/324 |

FOREIGN PATENT DOCUMENTS

| | | |
|---|---|---|
| DE | 102016006177 A1 | 11/2017 |
| EP | 0951942 A2 | 10/1999 |
| GB | 2097291 A | 11/1982 |
| JP | S57-147464 A | 9/1982 |
| JP | H10165848 | 6/1998 |
| JP | 2002102750 A | 4/2002 |
| JP | 2002-166199 A | 6/2002 |
| JP | 2003-80123 A | 3/2003 |
| JP | 2005-288284 A | 10/2005 |
| JP | 2007222731 A | 9/2007 |
| JP | 2015-107489 A | 6/2015 |

OTHER PUBLICATIONS

Search Report for Serial No. GB1708763.6 dated Dec. 1, 2017.
K.P. Karunakaran, "Low cost integration of additive and subtractive processes for hybrid layered manufacturing," Robotics and Computer Integrated Manufacturing, vol. 26, No. 5, Oct. 1, 2010.
Office Action issued for Japanese Patent Application No. 2020-516964, dated Feb. 22, 2022 and its English translation.

* cited by examiner

METHOD OF MANUFACTURING A ROTARY ATOMISER BELL CUP

CROSS-REFERENCE TO RELATED APPLICATIONS

This application is a National Stage application of International Patent Application No. PCT/GB2018/051420, filed on May 24, 2018, which claims priority to British Patent Application No. 1708763.6 filed on Jun. 1, 2017, each of which is hereby incorporated by reference in its entirety.

TECHNICAL FIELD

This invention relates to rotary atomisers and rotary atomiser bell cups.

BACKGROUND

Rotary atomisers are used in various situations for coating surfaces. One particular use of rotary atomisers is in the field of paint spraying. This, for example, is common in the automotive industry for paint spraying of vehicles. In some such cases, a rotary atomiser spindle is mounted on a robot arm and this is moved through space and to different orientations in order to spray paint the vehicle. In other cases different support arrangements may be provided.

More generally rotary atomisers are used as a paint applicator in high volume production environments. Also called a 'paint bell', or 'bell applicator', they are preferred for high volume paint application due to superior transfer efficiency, spray pattern consistency, and low compressed air consumption, when compared to paint spray guns.

A bell cup comprises a conical or curved disc fixed to the shaft of a drive spindle which can for example be driven by a turbine. Paint is injected into the centre of the rear of the disc, and is atomised by being forced out to the edge of the cup by centrifugal forces. The flow of the paint over the cup and off the edge breaks up the paint into atomized droplets.

Where used, the turbine is a high speed, high precision air motor that rotates the bell cup at speeds ranging from 10,000 rpm to 70,000 rpm, depending on the cup diameter, atomisation desired, and physical properties of the paint. Typical turbines for this application use an air bearing, where the spinning shaft is suspended in a cushion of flowing compressed air, with virtually no frictional resistance.

An electrostatic system is typically provided for ensuring efficient coating of the work-piece. The electrostatic system can be internal or external (or direct or indirect charge), and supplies high voltage (say 30,000 to 100,000 volts DC) charge to the applicator, or the air surrounding it. This has the effect of negatively charging the paint, while causing a region of positive charge to form on the work-piece, resulting in electrostatic attraction between the paint and the work-piece.

Also provided can be a shaping air shroud, or shaping air ring. This is simply a ring with passages for air to flow out the front of the atomiser, outside of the cup diameter, to manage the size of the spray pattern produced. As more air is forced through the shroud, the atomised paint is forced into a smaller pattern.

As mentioned above, in use the bell cup of the rotary atomiser is rotated at high rates of rotation. Thus gyroscopic effects become relevant and can have an adverse effect on the operation, accuracy, or lifetime of the spindle or the robotic arm or other support arrangement as a whole.

Therefore, there is a desire to minimise the size and/or impact of such gyroscopic effects where possible.

SUMMARY

It is an aim of the present invention to address such issues.

According to one aspect of the present invention there is provided a rotary atomiser bell cup comprising a bell portion for spraying media in use and a hub portion via which the bell portion is rotatingly drivable in use, wherein the hub portion is a machined metal portion and the bell portion has been built up on the hub using an additive manufacturing process.

According to another aspect of the present invention there is provided a method of manufacturing a rotary atomiser bell cup comprising a bell portion for spraying media in use and a hub portion via which the bell portion is rotatingly drivable in use, the method comprising the steps of:

making the hub portion using machining; and building up the bell portion on the hub using an additive manufacturing process.

This can allow an accurate and efficient manufacture of the bell cup—allowing accuracy in the overall design given by use of a traditionally machined hub whilst allowing production of a lighter bell portion to minimise gyroscopic effects in use, and simplifying manufacture of the bell portion.

The bell cup may be machined after the additive manufacturing process. This may be to provide finished dimensions. The method may comprise machining the bell cup after the additive manufacturing process. This may be to provide finished dimensions.

The machining after the additive manufacturing process may comprise removal of material of the bell portion and/or of the hub portion.

The method may comprise the step of forming a platform portion as part of the hub portion during the initial machining of the hub portion, said platform portion being arranged to facilitate the building up of the bell portion. The method may comprise the step of machining away at least a part of the platform portion during machining after the additive manufacturing process.

This can help ensure effective and sufficient bonding between the hub portion and the bell portion.

The bell portion may be hollow so defining at least one internal void.

The bell portion may comprise at least one supporting rib provided in said internal void.

The bell portion may comprise an internal lattice structure provided in said internal void.

The bell portion may comprise a first outer conical wall portion and a second inner conical wall portion, wherein the internal void is provided therebetween and at least one support element is provided between the inner and outer conical wall portions. The at least one support element may, for example, comprise an internal lattice structure and/or at least one supporting rib.

The bell portion may define at least one aperture providing a fluid communication path between the internal void and the exterior of the bell portion. This path may act as an escape path from the internal void to the exterior of the bell portion. This can allow the escape of byproduct from the additive manufacturing process—for example unfused powder.

The additive manufacturing process may comprise laser sintering of metallic powder.

In such a case the at least one aperture may allow escape of unsintered metallic powder from the void.

The internal void may comprise no closed cells to ensure evacuation of unfused powder.

The void may provide a fluid communication passage through the interior of the bell portion for use in operation as part of a rotary atomiser. This may allow the delivery of a fluid, say a cleaning fluid, to a desired location. The bell portion may define at least one fluid delivery aperture for allowing flow of fluid out of the internal void to the exterior of the bell portion.

The bell portion may comprise at least two apertures providing a fluid communication path between the internal void and the exterior of the bell portion. A first of the apertures may act as a fluid inlet and a second of the apertures may act as a fluid outlet during operation of the bell cup as part of a rotary atomiser.

The hub portion may comprise an interface portion for mounting to a spindle for rotatingly driving the bell cup. The hub may be arranged for mounting on a shaft of the spindle.

The interface portion may also be used for mounting the hub/the bell cup on a tooling shaft for machining before and/or after the additive manufacturing process.

The interface portion may comprise a datum relative to which machining before and/or after the additive manufacturing process may be conducted.

According to a further aspect of the present invention there is provided a method of manufacturing a rotary atomiser spindle including a bell cup comprising a bell portion for spraying media in use and a hub portion via which the bell portion is rotatably drivable by the spindle in use, the method comprising the steps of:

making the hub portion using machining, the hub portion having an interface portion for mounting to the spindle which interface portion comprises a datum;

building up the bell portion on the hub using an additive manufacturing process;

machining the bell cup relative to the datum after the additive manufacturing process; and mounting the bell cup to the remainder of the spindle for rotational drive.

According to yet a further aspect of the present invention there is provided a rotary atomiser spindle comprising a bell cup as defined above in which the bell cup is mounted to the remainder of the spindle for rotational drive, wherein the hub portion has an interface portion for mounting to the spindle which interface portion comprises a datum and the bell cup has been machined relative to the datum after the additive manufacturing process.

The spindle may comprise a main body within which is journaled a shaft for rotation relative to the main body. The bell cup may be mounted on the shaft via the hub.

The spindle may comprise one or more radial air bearing in which the shaft is journaled. The spindle may comprise a turbine which is mounted on the shaft for rotatingly driving the shaft and hence bell cup. The main body may be arranged for feeding drive gas to the turbine.

According to a further aspect of the present invention there is provided a method of repair or modification of a rotary atomiser bell cup comprising the step of building up regions of material on the bell cup using additive manufacture.

This be carried out whether the initial bell cup is produced as described further above or more conventionally. Worn regions of bell cups might be built back up with additive manufacture and optionally final machined. Alternatively the operative shape of a bell cup (worn or unworn) may be modified by additive manufacture to give different performance and optionally final machined.

Note that in general each of the optional features following each of the aspects of the invention above is equally applicable as an optional feature in respect of each of the other aspects of the invention and could be re-written after each aspect with any necessary changes in wording. Not all such optional features are re-written after each aspect merely in the interests of brevity.

BRIEF DESCRIPTION OF THE DRAWINGS

Embodiments of the present invention will now be described, by way of example only, with reference to the accompanying drawings in which.

DETAILED DESCRIPTION

Figure 1:
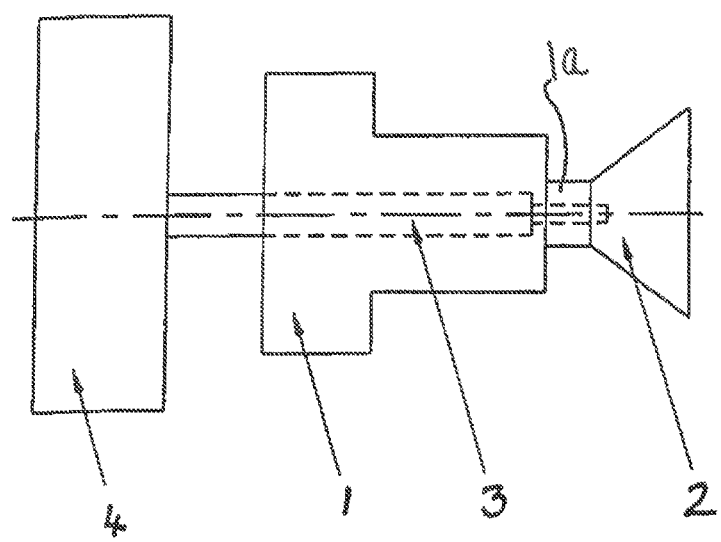
FIG. 1 schematically shows a rotary atomiser in the form of a paint sprayer.

FIG. 1 schematically shows a rotary atomiser in the form of a paint sprayer which comprises a rotary atomiser spindle 1 comprising and arranged for rotatingly driving a paint spraying bell cup 2. The spindle 1 comprises a shaft 1a which is journaled in at least one radial air bearing (not shown) and carries a turbine wheel (not shown) for rotational drive of the shaft 1a under action of drive gas. The paint sprayer shown in FIG. 1 also comprises a supply arrangement 3 for supplying material, i.e. paint in this case, from a reservoir 4 to the bell cup 2 so that this paint may be atomised by the bell cup 2 and projected towards the surface which is to be coated with paint. As is typical with paint sprayers such as this, paint is projected towards the surface to be painted by electrostatic force created by a high voltage applied between the spindle 1 and the surface to be painted.

Note that in alternatives other forms of drive besides turbine drive may be used, for example the shaft may be electrically driven.

The structure and operation of the paint sprayer at this level is conventional and such paint sprayers are widely used in the art and well understood. It is features of the spindle 1 and in particular the bell cup 2 which are of interest in the present invention. These will be described in more detail below.

Figure 2:
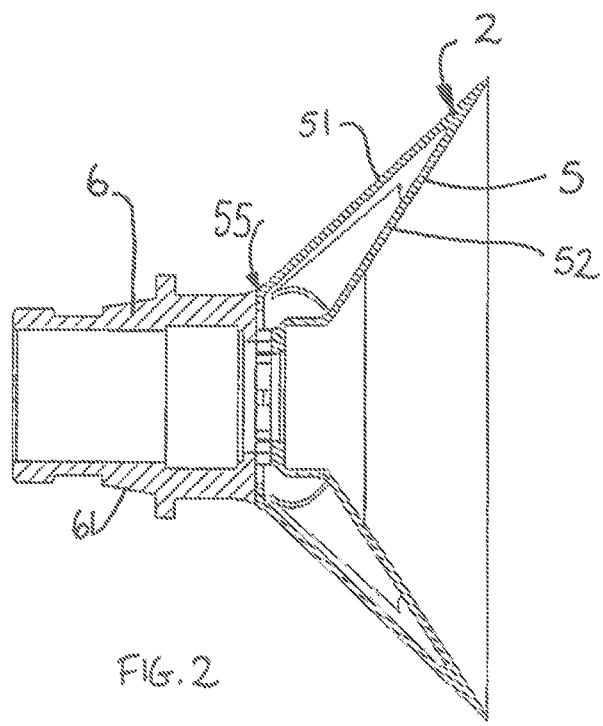
FIG. 2 is a sectional view showing a rotary atomiser bell cup of the rotary atomiser shown in FIG. 1 in more detail.

FIG. 2 shows in section the bell cup 2 of the rotary atomiser in more detail. In FIG. 2 the bell cup 2 is shown in a finished condition ready for attachment to the shaft 1a of the spindle 1.

The bell cup 2 comprises a bell portion 5 and a hub portion 6. The bell portion 5 is shown in isolation in FIGS. 3 and 4 and the hub portion 6 is shown in isolation in FIG. 5.

The hub portion is generally cylindrical and the bell portion is generally conical. The hub portion 6 is a machined metal part whereas the bell portion 5 is formed by an additive manufacturing process in particular by laser sintering of metal powder.

Figure 5:
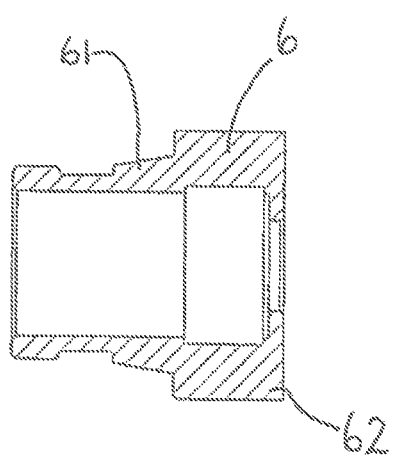
FIG. 5 is a sectional view of a hub portion of the bell cup shown in FIG. 2.

In manufacturing the hub portion 6 is first machined as an isolated component as shown in FIG. 5. The stub portion comprises an interface portion 61 which acts as a datum—in the present case the interface portion is a taper portion 61; in alternatives different forms of interface portion may be used. Machining of the hub portion 6 alone as well as bell cup 2 as a whole is carried out in reference to this datum. When the finished bell cup 2 is mounted to the shaft 1a this taper 61 fits with a corresponding taper (not shown) in the shaft 1a.

When the hub portion 6 is first machined and it is an isolated component as shown in FIG. 5, it comprises a platform portion 62 upon which the bell portion 5 can be built up via the additive manufacturing process providing a good area for fusing between the material (ie metal powder) used in the additive manufacturing process and the material of the hub portion 6.

Figure 6:
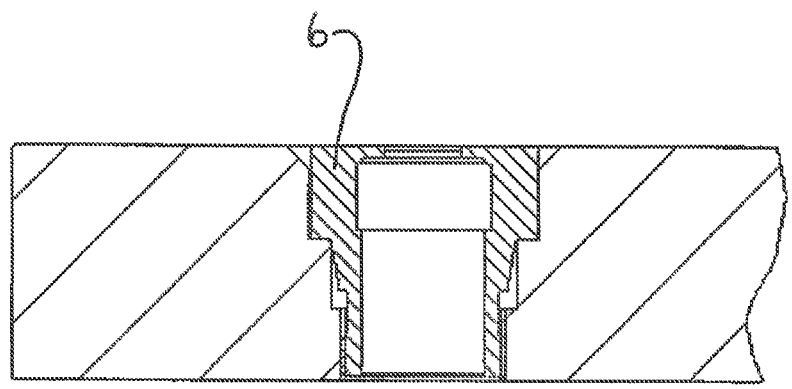
FIG. 6 shows the hub portion of FIG. 5 in a baseplate ready for build up of the bell portion on the hub portion.

FIG. 6 shows the hub portion 6 mounted in a baseplate ready for the addition of the bell portion 5 via the additive manufacturing process. The hub portion 6 is positioned in the base plate again with reference to the taper portion 61 as a datum.

In the present embodiment the hub portion 6 is formed from titanium and the metal powder used in the additive manufacturing process to form the bell portion 5 is titanium. Of course other suitable materials may be used.

As can be seen by a comparison between FIG. 2 and FIG. 5 not all of the platform portion 62 remains in the finished bell cup 2. This is because after the additive manufacturing process is used is to build up the bell portion 5 on the hub portion 6, further machining is carried out relative to the datum provided by the taper portion 61 machining away material of the hub 6 and bell portion 5 as originally formed in additive manufacture to provide the final shape. This allows both good fusing between the material used in the additive manufacturing process and the material of the hub portion 6 as well as the provision of an accurately finished bell cup 2.

It would be difficult or impossible to produce such an accurately finished bell cup using additive manufacturing alone or more particularly if the whole of the hub portion 6 and bell portion 5 were first formed using an additive manufacturing process and then machined.

Furthermore, using the additive manufacturing process to form the bell portion 5 carries with it the advantages that the bell portion 5 may be made as light as possible and a relatively complex shape for the bell portion 5 and its internal features can be more easily produced.

Figure 3:
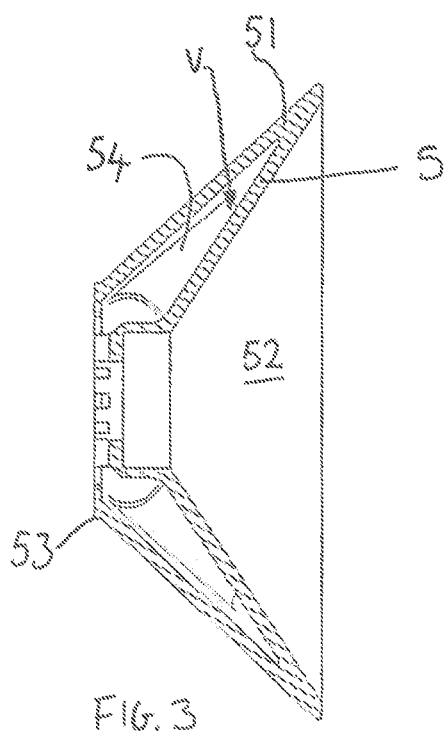
FIG. 3 is a sectional view of a bell portion of the bell cup shown in FIG. 2.
Figure 4:
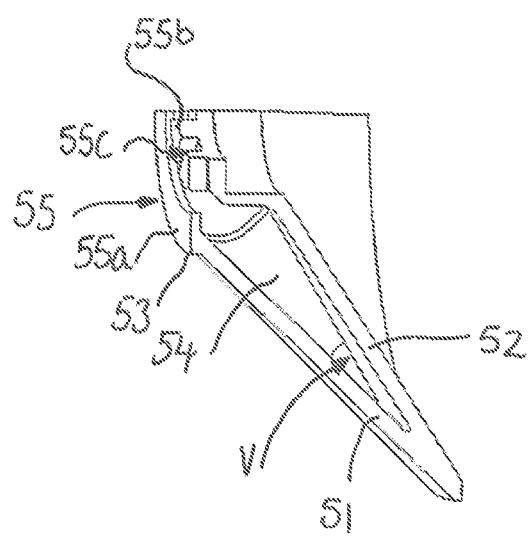
FIG. 4 is a perspective view of part of the bell portion shown in FIG. 3.

As can be seen in FIGS. 2, 3 and 4 the bell portion 5 comprises an outer conical wall 51 and inner conical wall 52. Between these is formed a void V and thus the bell portion 5 is hollow. As can be discerned by a comparison of FIGS. 3 and 4 on the one hand and FIG. 2 on the other hand, the conical wall portions 51, 52 have greater thickness before the final machining has taken place to produce the final bell cup as shown in FIG. 2. That is to say FIGS. 3 and 4 illustrate the bell portion 5 as it is built up using the additive manufacturing process and before final machining. Thus as with the hub portion 6, material of the bell portion 5 is removed during the final machining process which again is carried out relative to the datum provided by the taper 61 to allow production of the finished bell cup 2 with the desired dimensions to the required precision.

Thus, for example in the bell portion 5 as produced by the additive manufacturing process there is a shoulder portion 53 as indicated in FIG. 4 which is not present in the same form in the finished bell cup 2 shown in FIG. 2 as at least part of this is machined away when part of the platform portion 62 of the hub 6 is also machined away in the final machining.

In the present embodiment a plurality of supporting ribs 54 are provided in the void V between the inner and outer conical walls 51, 52. In the present embodiment 8 such supporting ribs are provided around the bell cup 5 at equal angular spacings. Of course different numbers of ribs may be used.

In alternatives rather than a plurality of spaced supporting ribs 54, the void V may be provided with a supporting lattice structure.

Whatever internal support is provided between the two conical walls 51, 52 it is important that no closed cells are formed so as to allow the evacuation of unfused powder from the void V after the additive manufacturing process so as to minimise the weight of the finished bell portion 5. Note that the use of the additive manufacturing process, the internal supports 54, and the final machining of the sidewalls 51, 52 and hub 6 following the additive manufacturing process, can all contribute to minimising the weight of the bell cup 2 and hence the gyroscopic forces which it will generate under high speed rotation.

The bell portion 5 has a rear and face 55 which faces the hub portion 6 in the completed bell cup 2. The rear end face 55 has two parts, an outer portion 55a which is at the end of the outer conical wall 51 and an inner portion 55b which is at the end of the inner conical wall 52.

In the finished bell cup 2 as shown in FIG. 2, the outer end face portion 55a is fused with the corresponding facing portion of the platform portion 62 of the hub 6. On the other hand, part of the inner end face portion 55b is also is also fused to the platform portion 62 of the hub 6 but part of the inner end face portion 55b overhangs the platform portion 62 into a bore of the hub portion 6. Slots 55c are provided in the inner end face portion 55b which form apertures that provide a fluid communication path between the void V in the interior of the bell cup 2 and the exterior. These fluid communication paths can act as an escape path for unfused powder present in the void V after the additive manufacturing process.

Also these slots 55c and the resulting apertures can be used for the introduction of fluid, for example cleaning fluid, into the interior of the bell cup 2 during its operation as a rotary atomiser. Further in alternatives, outlet apertures may also be provided in the bell cup to allow the passage of fluid out of the void V at a desired location. Thus, for example, slots may be provided in the outer conical wall 51 to allow such fluid to escape. In such an alternative, fluid then may be fed into the void V via the slots 55c and allow to escape via the apertures provided in the outer conical wall 51.

It will be appreciated that apertures may be provided at different locations if desired. Furthermore, if desired apertures originally provided for allowing escape of unfused powder out of the void V may be sealed once they have performed this function.

Note that in the present embodiment, there is an annular space between the outer end face portion 55a and inner end face portion 55b. The presence of this annular spacing is not essential but further helps to reduce mass in the bell cup 2 and maximise the fluid communication path between the void V and the exterior.

Note that in finish machining, as well as machining the conical walls 51, 52 and the outside wall of the hub portion 6 in the region of the platform portion 62 as mentioned above, machining of the central bore of the hub portion 6 and of the bell portion 5 (as formed in the region of the inner end face portion 55*b*) may be performed.

In alternatives additive manufacture may be used in the repair or modification of rotary atomiser bell cups. This can be carried out whether the initial bell cup is produced as described above or more conventionally. Worn regions of bell cups might be built back up with additive manufacture and optionally final machined. Alternatively the operative shape of a bell cup (worn or unworn) may be modified by additive manufacture to give different performance.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method of manufacturing a rotary atomiser bell cup comprising a bell portion for spraying media in use and a hub portion via which the bell portion is rotatingly drivable in use, the method comprising the steps of: making the hub portion using machining; and building up the bell portion on the hub portion using an additive manufacturing process, the method further comprising the step of forming a platform portion as part of the hub portion during an initial machining portion of the making the hub portion, said platform portion being arranged to facilitate the building up of the bell portion and machining away at least a part of the platform portion during machining after the additive manufacturing process.

2. The method according to claim 1 comprising machining the bell cup after the additive manufacturing process.

3. The method according to claim 2 in which the machining after the additive manufacturing process comprises removal of material of the bell portion and of the hub portion.

4. The method according to claim 1 comprising the step of allowing escape of byproduct from the additive manufacturing process via at least one aperture in the bell portion.

5. The method according to claim 1 comprising machining the hub in reference to a datum on the hub before the additive manufacturing process and machining the bell cup in reference to the datum after the additive manufacturing process.

6. The method according to claim 1 wherein the rotary atomizer bell cup is part of a rotary atomizer spindle, wherein the hub portion has an interface portion for mounting to a remainder of the spindle, which interface portion comprises a datum;

wherein the method further comprises:
machining the bell cup relative to the datum after the additive manufacturing process; and
mounting the bell cup to the remainder of the spindle for rotational drive.

\* \* \* \* \*